Patented Dec. 7, 1948

2,455,749

UNITED STATES PATENT OFFICE 2,455,749

CONDIMENT

Aladar Fonyo, La Grange, Ill., assignor to Wm. J. Stange Co., Chicago, Ill., a corporation of Illinois No Drawing. Application March 15, 1946, Serial No. 654,807

3 Claims. (Cl. 99—140)

My invention contemplates and provides a new and desirable condiment for table and kitchen use.

The condiment of my invention comprises as seasoning agents pungent and aromatic derivatives of black pepper commingled with sugar-coated particles of common salt.

An object of my invention is to provide a condiment of the kind described in the last preceding paragraph wherein the pungent and aromatic derivatives of the black pepper are rendered immune from deterioration by the salt and objectionable volatilization from the condiment without associating with the salt or the sugar any protective agent that cannot be obtained as a natural constituent of an extraction of black pepper.

Another object of my invention is the provision of a satisfactory condiment as hereinbefore described which economically can be produced from only salt, sugar and black pepper.

A salient and characterizing feature of my new condiment is the fact that the pungent and aromatic black pepper derivatives which it contains are accompanied by the kinds and substantially the quantities of chlorophyll, and preferably also the kinds and substantially the quantities of carotinoids, with which such pungent and aromatic derivatives occur in whole peppercorn.

I believe I am the first to appreciate the feasibility and desirability and advantages of having any salt base condiment or sugar base condiment or salt-sugar base condiment contain pungent and aromatic derivatives of black pepper (by which is meant the oleoresins volatile oils and piperines thereof) accompanied by either chlorophyll or carotinoids with which they naturally occur.

In manufacturing my new condiment I grind whole peppercorn and subject same, with the aid of an appropriate percolator, to successive heatings in a suitable organic solvent such as alcohol, benzine, chlorinated hydrocarbons like ethylene dichloride, or ether. These heatings preferably are effected at temperatures below the boiling point of the solvent and not over 140° F. The menstruum resultant from each heating is withdrawn. Then, without taking any steps to remove or minimize their contents of chlorophyll or carotinoids, the several quantities of menstruum, either separately or in one batch, are heated in vacuo to recover the solvent. What remains is a dark green viscous partly liquid and partly crystalline extraction of black pepper which contains oleoresin, volatile pepper oil, piperine, chlorophyll and carotinoids.

To 100 pounds of fine crystalline common salt I add from about one to about one and one-fourth pounds of caramelized sugar solution (commercially known as caramel coloring) which has been diluted by adding thereto about 10% of hot water. The salt and its added caramelized sugar solution are thoroughly agitated, as in a dough mixer or Muller-type blender, until the caramelized sugar solution thoroughly and uniformly coats all particles of the salt. The sugar-coated salt is then dried, in a vacuum evaporator or otherwise. With the dried sugar-coated salt I thoroughly intermix a relatively very small percentage of the aforementioned dark green viscous partly liquid and partly crystalline extract of black pepper. For example, but not by way of limitation, it may be said that about three pounds is a suitable quantity of such extraction to add to about each one hundred pounds of the sugar-coated salt.

In the resultant condiment, which has a desirable rich dark creamy color, the oleoresin, volatile pepper oil, piperine crystals, chlorophyll and carotinoids of the black pepper extraction are adhered to but spaced from the salt particles by the sugar coatings of such salt particles. Such a condiment may be stored indefinitely, in condiment shakers or other packages, without the pungent and aromatic derivatives of the pepper suffering deterioration by reason of their association with the salt and without such pungent and aromatic derivatives of the pepper being substantially or objectionably volatilized from the condiment.

When such condiment is added to food, the sugar-coated salt quickly dissolves in either the juices of the food or the saliva and is made immediately available to the palate when the food is eaten. While the sugar-coated salt contains a relatively very small percentage of the pungent and aromatic derivatives of the black pepper, the fact is that a given quantity of my new condiment will impart a richer flavor to food than will any comparable quantity of ground black pepper.

Having thus described my invention, what I claim as new and desire to secure by Letters Patent of the United States is:

1. A condiment, characterized by the substantial immunity of its content of pungent and aromatic derivatives of black pepper from deterioration by the salt with which they are associated, comprising a major quantity of finely divided common salt, and a minor quantity of a viscous partly liquid and partly crystalline extraction of black pepper including its naturally occurring chlorophyll oleoresin, volatile pepper oil and piperine.

2. A condiment according to claim 1 in which the extraction of black pepper also includes naturally occurring carotinoids.

3. A condiment according to claim 1, additionally characterized by its dark creamy color, which includes a caramelized sugar adhesive by which minute particles of the extraction of black pepper are retained upon the particles of the salt.

ALADAR FONYO.

REFERENCES CITED

The following references are of record in the file of this patent:

UNITED STATES PATENTS

| Number | Name | Date |
|---|---|---|
| 1,940,624 | Feight | Dec. 19, 1933 |
| 2,079,415 | Levinson | May 4, 1937 |
| 2,134,380 | Stange | Oct. 25, 1938 |
| 2,260,897 | Griffith et al. | Oct. 28, 1941 |